(12) United States Patent
Josset et al.

(10) Patent No.: US 7,197,864 B2
(45) Date of Patent: Apr. 3, 2007

(54) TRANSPORT ARRANGEMENT FOR AN AGRICULTURAL MACHINE HAVING A DETACHABLE FRONT ATTACHMENT

(75) Inventors: Etienne Josset, Arc les Gray (FR); Emilie Vincent, Lagesse (FR); Jean-Yves Dubois, Cresancey (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/313,636

(22) Filed: Dec. 21, 2005

(65) Prior Publication Data

US 2006/0156707 A1    Jul. 20, 2006

(30) Foreign Application Priority Data

Jan. 18, 2005    (DE)    ............ 10 2005 002 221

(51) Int. Cl.
*A01B 73/00*    (2006.01)
(52) U.S. Cl. ............... 56/228; 280/769; 172/311
(58) Field of Classification Search ............... 56/228; 280/789, 475, 411, 414.1, 418.1, 400, 760; 414/462, 546, 44; 172/311, 310, 456, 315, 172/248, 677, 776, 683, 684
See application file for complete search history.

(56) References Cited

U.S. PATENT DOCUMENTS

| | | | | |
|---|---|---|---|---|
| 3,413,014 | A * | 11/1968 | Franz | 280/400 |
| 3,450,220 | A * | 6/1969 | Frandsen et al. | 180/14.1 |
| 3,542,135 | A * | 11/1970 | McCanse | 172/319 |
| 3,572,759 | A * | 3/1971 | Baugh et al. | 172/272 |
| 3,683,605 | A * | 8/1972 | Jakobi | 56/228 |
| 4,214,637 | A * | 7/1980 | Applequist | 172/484 |
| 4,268,209 | A * | 5/1981 | Westerman | 414/462 |
| 4,286,672 | A * | 9/1981 | Forsyth et al. | 172/311 |
| 4,329,833 | A * | 5/1982 | Witzel | 56/228 |
| 4,371,299 | A * | 2/1983 | Cain et al. | 410/44 |
| 4,384,445 | A | 5/1983 | McIlwain | |
| 4,385,483 | A * | 5/1983 | McIlwain | 56/228 |
| 4,428,435 | A * | 1/1984 | Hubbard et al. | 172/328 |
| 4,664,202 | A * | 5/1987 | Applequist et al. | 172/311 |
| 4,770,577 | A * | 9/1988 | Farris | 410/2 |
| 4,834,598 | A * | 5/1989 | Bruns | 410/2 |
| 4,906,039 | A * | 3/1990 | Broman | 296/37.6 |
| 5,040,825 | A * | 8/1991 | Kuhns | 280/789 |
| 5,380,029 | A * | 1/1995 | Portilla | 280/414.5 |
| 5,485,797 | A * | 1/1996 | Green et al. | 111/200 |
| 5,494,309 | A * | 2/1996 | Roy | 280/401 |
| 5,746,275 | A * | 5/1998 | Cross et al. | 172/440 |
| 5,857,831 | A * | 1/1999 | Wilson | 414/812 |
| 5,970,695 | A * | 10/1999 | Dunn | 56/228 |
| 6,050,586 | A * | 4/2000 | Wilson | 280/475 |
| 6,254,117 | B1 * | 7/2001 | Cross | 280/401 |
| 6,550,543 | B1 * | 4/2003 | Friggstad | 172/311 |
| 6,935,656 | B2 * | 8/2005 | Stout | 280/769 |

FOREIGN PATENT DOCUMENTS

| | | |
|---|---|---|
| DE | 29 28 524 | 1/1981 |
| DE | 31 29 537 | 2/1983 |
| DE | 199 38 727 | 3/2001 |

* cited by examiner

*Primary Examiner*—Árpád Fábián Kovács

(57) ABSTRACT

An agricultural machine, such as a self-propelled harvester, includes an attachment that is removably mounted to the machine. A transport device is adapted to be removably mounted onto the attachment to support the attachment during road transport of the machine. A receiving assembly, mounted on the machine, receives the transport device and supports the transport device when it is removed from the attachment for harvesting operations.

12 Claims, 3 Drawing Sheets

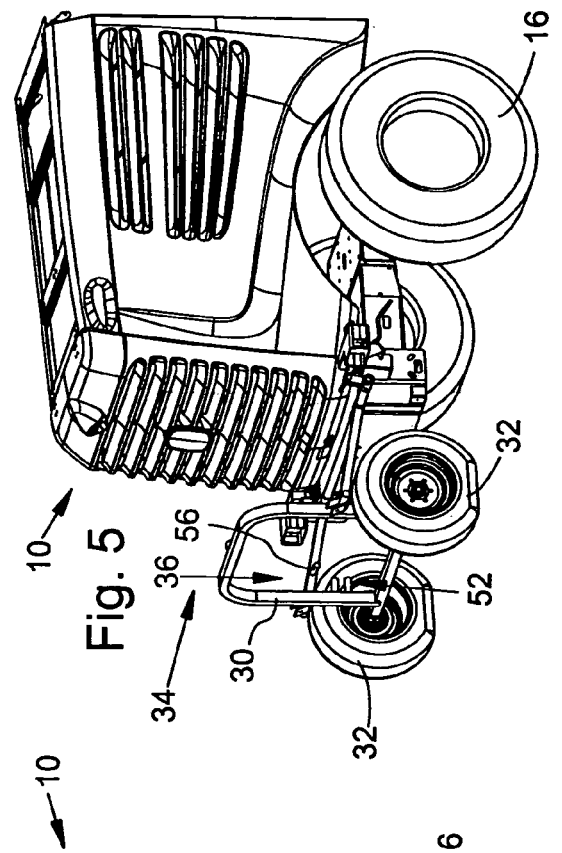
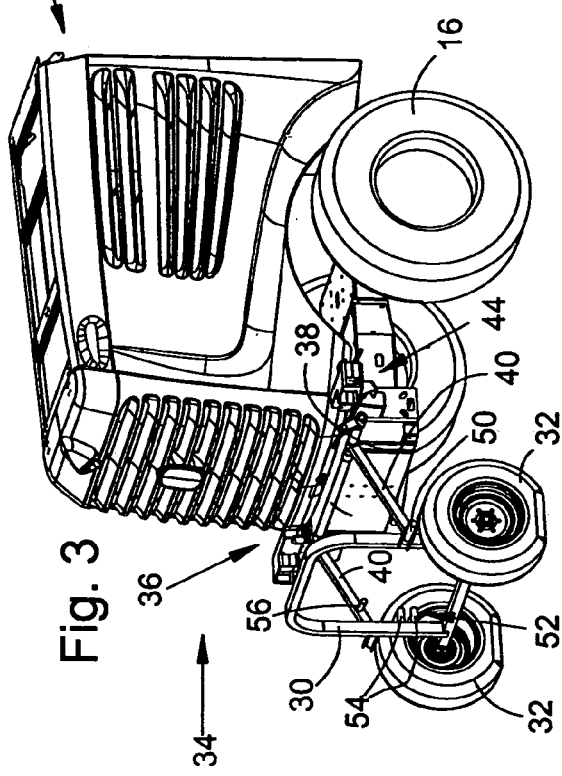
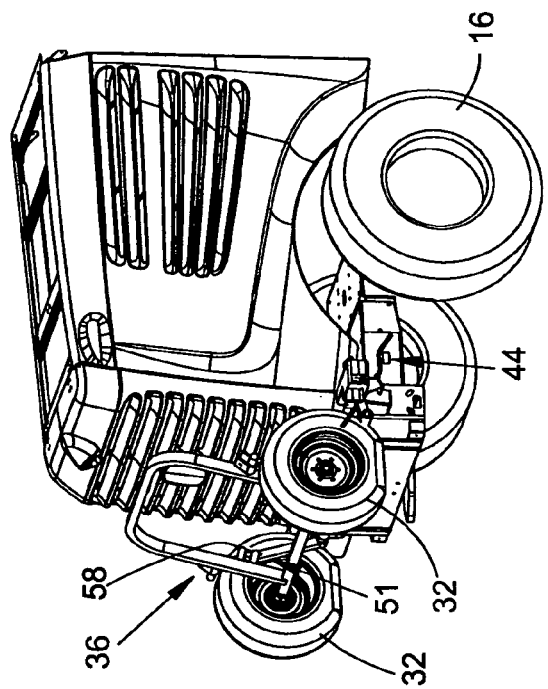

TRANSPORT ARRANGEMENT FOR AN AGRICULTURAL MACHINE HAVING A DETACHABLE FRONT ATTACHMENT

FIELD OF THE INVENTION

The invention concerns an agricultural machine, preferably a self-propelled harvester, having a detachable front harvesting attachment, and more specifically a transport arrangement and device for road support of the detachable front harvesting attachment.

BACKGROUND OF THE INVENTION

Detachable harvesting front attachments are used on agricultural machines, such as self-propelled harvesters, field choppers and combines, for collecting harvested goods. These attachments are relatively expensive and heavy. Corn pickers or corn huskers, reels and "pick-ups" are examples of such front attachments. For economic reasons wider attachments are designed in order to be able to harvest the field in a shorter time and with fewer passes. One common width is, e.g., 6 meters. Such attachments frequently exceed the maximum admissible vehicle width for road travel. One possibility to be able to transport such an attachment is to disassemble it from the harvester, laying it on a transport device and trailer it with the harvester, or another suitable tractor, so as to be able to pull it in the direction of its longitudinal axis.

Prior transport devices have an axle provided with two wheels, wherein the transport device is mounted to the attachment such that the attachment is supported via the wheels on the ground. During harvesting, the transport device is taken up by a holder provided on the attachment.

The problem underlying these devices is that such a transport device is not readily accessible and additional weight is added to the attachment and, in particular, a non-uniform weight distribution is induced on the harvester and particularly the attachment.

SUMMARY OF THE INVENTION

The present invention provides a harvester having an attachment detachable from the machine, which can be supported for road transport on at least one transport device detachable from the attachment. A receiving device, that the transport device can pick up if it is detached from the attachment, is provided on the machine itself and not on the attachment. Thus, the attachment is not burdened with the weight of the receiving device during harvesting and when not supported on the transport device. This is particularly favorable because the means for holding the attachment on the machine can be made smaller, which is cost-favorable. There are also improved guidance properties of the attachment relative to the ground because the attachment is not burdened on one side by the weight of the transport device. Such a weight imbalance would increase the risk of the attachment cutting into the ground and would have to be taken accounted for in the design of the steering or control and the hydraulic or other equipment provided for this purpose. Furthermore, with the present invention the transport device is particularly accessible on the machine because a sufficiently free structural space is available for this purpose. Any agricultural machines having a detachable attachment are appropriate. The agricultural machine can be a harvesting machine or harvesting equipment with an attachment of the type of a harvesting machine or harvesting equipment attachment such as a reel, a collecting device, which is generally designated as a pick-up, or a corn harvester or corn picker. In particular, the machine is a self-propelled harvester of the type of a field chopper or a combine. It is also conceivable to use the invention on pulled or towed agricultural machines that have a detachable attachment, especially ones having a relatively large width. For example, balers, pulled choppers, machines for harvesting or processing grass or green fodder such as mower-crimpers, or any other suitable machine.

The receiving device can be provided on a side region of the machine. Alternatively, if the receiving device is provided on a rear section of the machine, the receiving device does not increase the width of the machine and does not interfere with the protective covers on the side region. This should assure the accessibility of the components of the machine located there-under.

A receiving assembly for a detachable transport device of an attachment, which is designed so that it can be attached to an agricultural machine, preferably a self-propelled harvester, as was described above, can be mounted on such a machine or offered as a working or dealer option and can be attached to the machines during production or mounted by a dealer. Thus, the requests for the most divergent types and designs of attachments can be handled in order to be able to optimally satisfy the customers' wishes.

The transport device can be installed on or in the receiving assembly by an attendant and/or with the aid of a manipulator or lifting device. This may be necessary due to the height of the machine and the associated fastening possibilities of the receiving device. It is particularly easy since the additional aid can be deployed if the receiving device can receive the transport device in a moving, or pivotable, manner. In this instance, the receiving assembly can assume a first position wherein the transport device can be taken up by the receiving assembly, and a second position wherein the transport device does not affect the minimum ground clearance of the machine, thereby hindering operation of the machine as little as possible, or not at all. For this purpose, the receiving assembly is designed to be movable, in that the transport device receives the receiving assembly in a slidable or pivotable manner and has components or structural groups suitable therefor.

It is conceivable that the receiving assembly can receive the transport device in the horizontal direction or be pivotable about a vertical axis. The necessary width can thus be reduced if the receiving device is located in a side region. But it is particularly favorable if the receiving device can receive the transport device, movably or pivotably, essentially in the vertical direction so that the transport device can be taken up in a lowered position of the receiving device and then be moved up into a higher position where it is protected and/or does not interfere with the operation of the agricultural machine.

The receiving device can have holders, consoles, hooks or slidable components or a parallelogram guidance, etc. It is particularly simple, however, if the receiving device has one supporting arm that can collaborate with the transport device to take it up and support it. This supporting arm is provided to be moveable, particularly slidable or pivotable. A particularly secure reception of the transport device is assured if at least two horizontally spaced supporting arms are provided. It is also conceivable for the supporting arms to be additionally or alternatively spaced vertically from each other, to be adapted to the structural form or geometry of the transport device. Additional supporting arms or support or holding devices can also be provided.

The supporting arm or arms can have a receiving device preferably in a U-shape or of the type of a claw or a hook, which can collaborate with the transport device. This receiving device is preferably located in an end region of the pertinent supporting arm, facing away from the agricultural machine. In a suitable design, the transport device can be held in the receiving device, especially with a movement or a pivoting, without the use of other securing means. Despite this, the use of appropriate securing means is possible.

It is conceivable to move or swing the receiving device manually by an attendant acting directly on the corresponding supporting arm. Preferably, an actuating device is provided, whereby the receiving device and the supporting arm, or at least one of the supporting arms, can be moved.

For this purpose, the actuating device can contain at least one manually actuatable crank drive. One of these is maintenance-friendly and cost-favorable. However, it is also possible to provide one or more motors such as electric motor, a hydraulic drive, a chain drive and/or a transmission, etc.

To secure the receiving device and the transport device on the machine or in a transport position preferably moved or swung upward on the machine, at least one securing device can be provided. This can be provided independently of the actuating device, collaborate with the actuating device, or be integrated with the collaborating device.

If a transport device is designed so that it can be detachably taken up by a receiving device as described above, only a few separate components or securing means are necessary to assure the reception of the transport device by the receiving device.

Such a transport device has at least one frame having at least one transport means, such as a wheel or a runner or skid, with at least one receiving means that is designed so that it can be taken up by the receiving device or by the supporting arm or arms or the receiving device or devices. In the receiving means, a bolt is joined solidly with the frame and can be securely received by a receiving device that is designed as a "U," a claw or a hook. It is also conceivable to provide a lug, loop or a recess or to design the receiving means in any other suitable way.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is a perspective view of a rear portion of the machine having a receiving device to hold the transport device on the machine, wherein the receiving device is shown in a lowered position for receiving the transport device;

FIG. 5 is a perspective view similar to FIG. 3, wherein the receiving device and the transport device are partially pivoted upward;

FIG. 6 is a perspective view similar to FIG. 3 and 5, wherein the receiving device and the transport device are pivoted completely upward to a transport position.

DETAILED DESCRIPTION OF THE INVENTION

Figure 1:
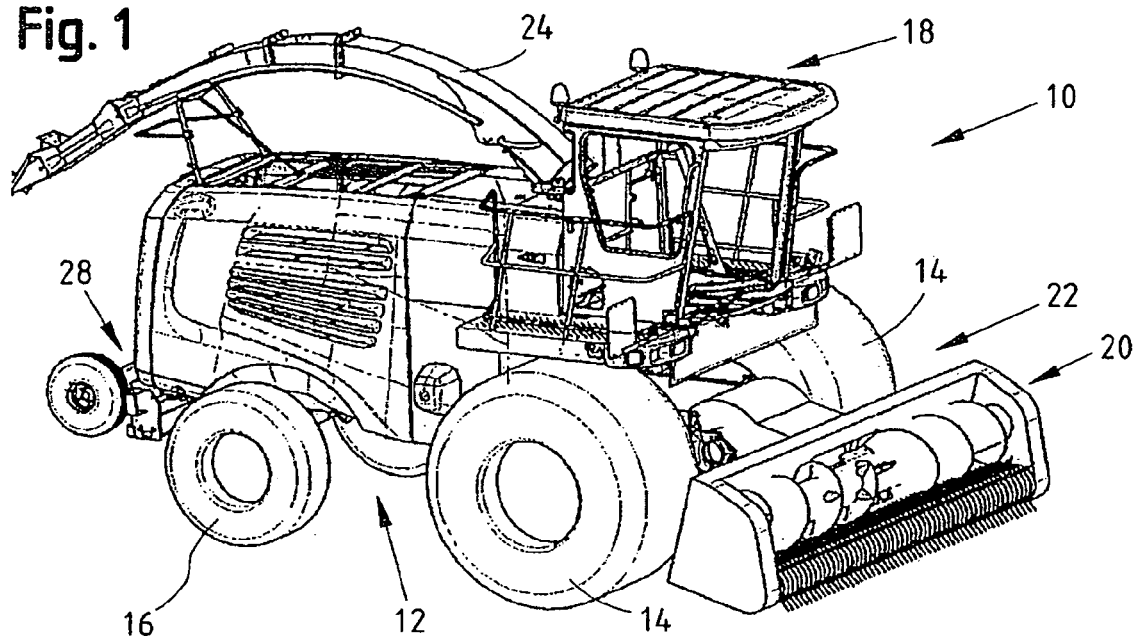
FIG. 1 is a perspective view of a self-propelled agricultural machine having a detachable attachment and also have a transport device applied in a rear region of the machine.

Referring to FIG. 1, an agricultural machine 10 shown in a harvesting operation of the type of a self-propelled field chopper is constructed on a frame 12 that is carried by front and rear wheels 14 and 16. The front wheels 14 serve as the main drive wheels, while the rear wheels 16 are steerable. The machine 10 is operated from a driver cab 18, from which an attachment 20 is visible. By means of the attachment 20, material picked up from the ground is conveyed over a feed assembly 22 to a chopping drum inside of the machine 10, which chops the material into small pieces and sends it to a conveyor arrangement (not shown). The material leaves the machine 10 and goes into a trailer pulled alongside through a rotatable discharge chute 24. An arrangement for further processing (not shown) can be located between the chopping drum and the conveyor mechanism. Additional details of such a machine 10 are sufficiently known.

The attachment 20 is fastened on the front side of the harvester vehicle 10 and serves to pick up the harvested material. According to the embodiment shown, the attachment 20 is a so-called crop pick-up.

Due to the dimensions and weight of such an attachment 20, it is desirable to remove the attachment 20 from the machine 10 if the machine 10 is to be driven or transported on a road. This may be necessary because modern attachments can readily exceed the admissible total width of a vehicle allowed on the road.

Figure 2:
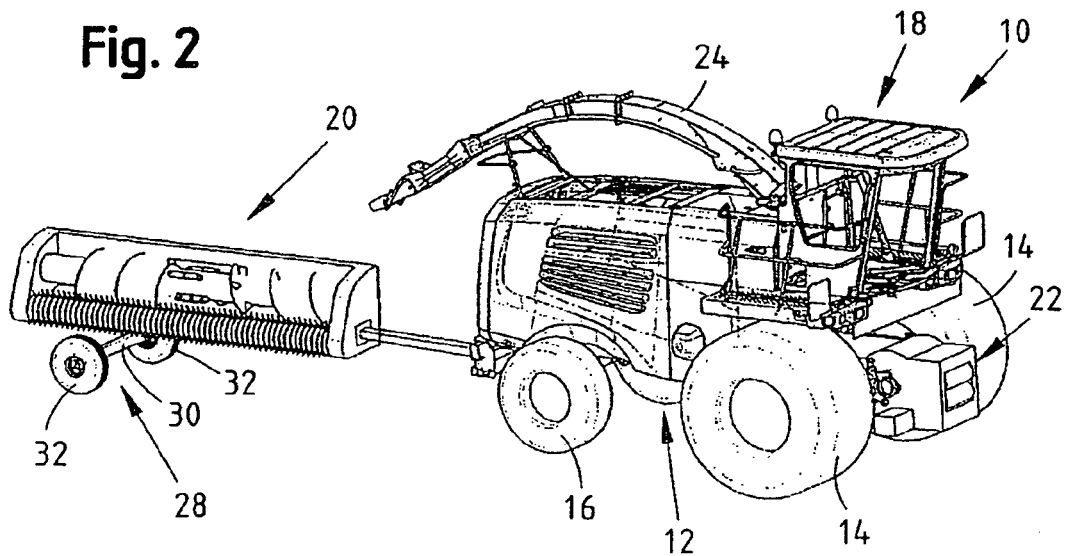
FIG. 2 is a perspective view of the machine shown in FIG. 1, wherein the attachment is removed from the machine and connected to the machine in the rear region, wherein the attachment is supported on the transport device and wherein the machine is in a state suitable for road transport.

Referring now to FIG. 2, the machine 10 is shown in a state suitable for transport or road travel. The attachment 20 is removed from the front side of the machine 10 and is connected in the rear via a train or draw bar 26 in the form of a pole or shaft, such that the attachment can be pulled by the machine.

The attachment 20 is supported through a transport device 28. The transport device has a frame 30 and two wheels 32. As seen with reference to FIG. 1, the transport device 28 is carried on the rear side of the machine 10 in harvesting operation. Both the transport device 28 and its support on the machine 10 are discussed in more detail below.

Figure 4:
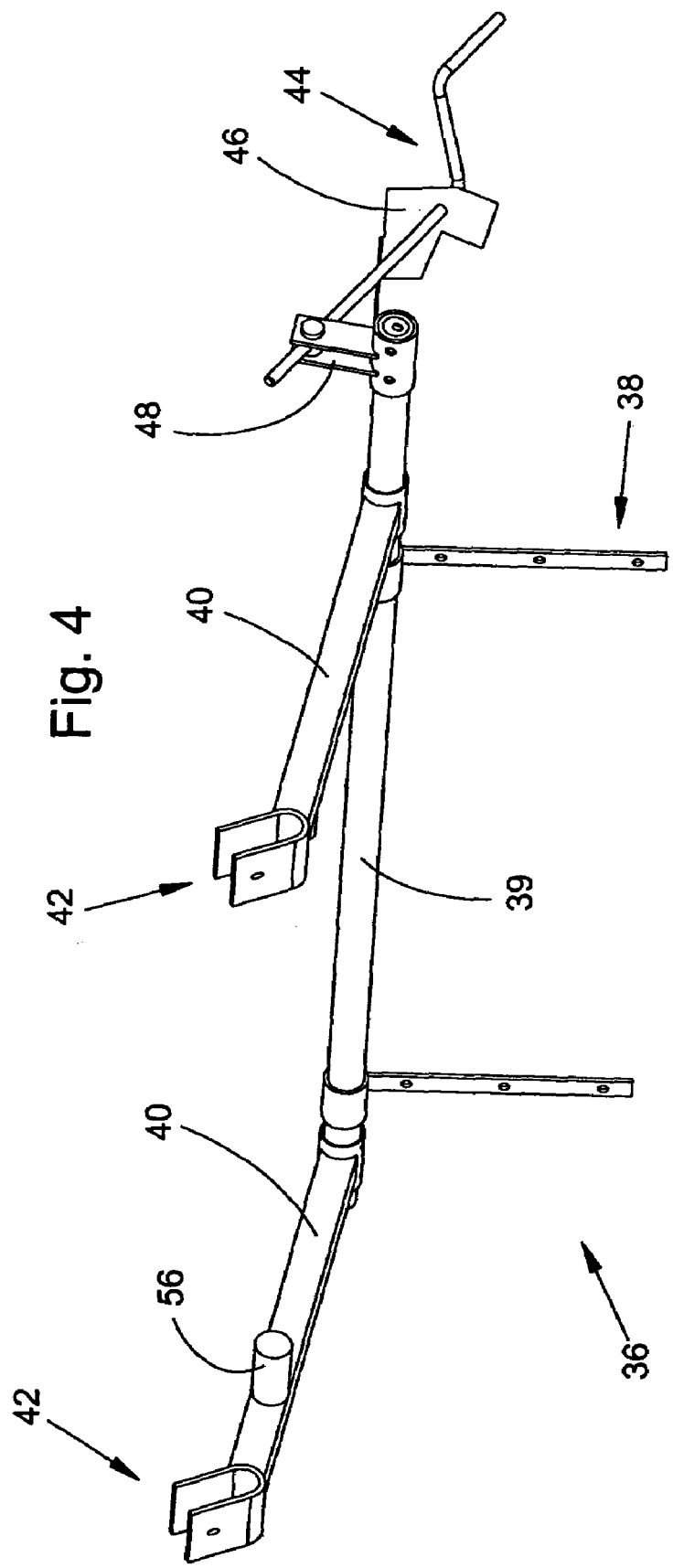
FIG. 4 is a perspective view of the receiving device removed from the machine.

Referring now to FIGS. 3, 5 and 6, rear section 34 of the machine 10, with the rear wheels 16, is shown. The rear section 34 includes a receiving assembly 36 for receiving and storing the transport device 28 during harvesting operations. FIG. 4 shows an enlarged view of the receiving assembly 36 removed from the rear section 34 of the machine 10.

The receiving assembly 36 has a mounting frame 38 that is detachably connected to the rear section 34 of the machine 10 with bolts, so that the receiving assembly 36 can be applied as an optional component on the machine 10 or detached from the machine 10. A generally horizontal shaft 39 is carried pivotably by the mounting frame 38. Two supporting arms 40 are connected with and extend from the shaft 39, generally at both ends of the shaft 39 so that they can pivot vertically as the shaft 39 rotates. A generally U-shaped receiving device 42 is provided at the other ends of the supporting arms 40. The opening of the "U" is oriented generally away from the rear section 34, in a lowered state of the receiving assembly 36, and is oriented generally upward, in a raised state of the receiving assembly 36.

The receiving assembly 36 also has an actuating device 44. This actuating device 44 is designed as a crank drive that has a threaded shaft that can be screwed in or out in a holder 46, via a bore therein; the holder 46 being provided on the mounting frame 38. A lever 48 is fixedly connected without rotational freedom, to the shaft 39. The lever 48 is pivoted so that the supporting arms 40 consequently pivot upward or downward upon rotation of the actuator device 44.

Reference is again made to FIG. 3, from which it is clear that receiving means 50 are provided on the frame 30 of the transport device 28. The receiving means 50, which may be round pins or shafts extending from the frame 30, are designed to be taken up by the receiving device 42 of the receiving assembly 36 when the transport device 28 is removed from the attachment 20 and connected to the receiving device 42.

The receiving devices 42 are designed, according to the above embodiment example, so that the receiving means 50 are held securely in the receiving devices 42 as soon as they are introduced into them. Securing of the receiving means 50 to the receiving devices 42 by one or more securing means, such as a cotter pin, is also alternatively or additionally conceivable.

If the transport device 28 is to be taken up and stored by the receiving device 36, the attendant actuates the actuating device 44 by turning the crank. Upon turning of the crank the receiving assembly 36, the supporting arms 40, and the transport device 28 are swung upward, as shown in FIG. 5, until they have reached the "full up" position shown in FIG. 6.

Referring particularly to FIG. 6, the receiving assembly 36 and the transport device 28 are held in this position by a securing device 51. This securing device 51 has a claw 52 solidly connected to the frame 30 of the transport device 28. Two holders or prongs 54 extend generally laterally from the frame 30, and a bolt or pin 56 is provided on one of the supporting arms 40 (FIG. 4). The bolt 56 and the claw 52 are positioned such that the bolt 56 and the claw 52 engage each other once the receiving assembly 36 and the transport device 28 are pivoted completely upward, as shown in FIG. 6. Once engaged, a securing means 58, such as a cotter pin, can be inserted through the prongs 54 of the claw 52 to capture the bolt 56 therein and prevent inadvertent lowering of the supporting arms 40.

The actuating device 44 may also be designed to be self-securing so that it permits movement of the supporting arms 40 only if a crank or other means, such as a motor, is actuated or activated.

In accordance with the provisions of the patent statutes, the present invention has been described in what is considered to represent its preferred embodiment. However, it should be noted that the invention can be practiced otherwise than as specifically illustrated and described.

The invention claimed is:

1. An agricultural machine having a front section and a rear section, as considered in a forward direction of travel, comprising:
   a front harvesting attachment removably mounted on said front section of the machine such that a working width of said harvesting attachment extends transversely to said direction of travel;
   a transport device including a ground-engaging wheel assembly and being selectively removably mounted onto the harvesting attachment so as to support the harvesting attachment such that said working width extends in said direction of travel during road transport of the machine;
   a receiving assembly mounted on the harvesting machine, the receiving assembly including at least one receiving device for selectively receiving and holding the transport device in storage when the transport device is removed from the harvesting attachment and the machine is engaged in harvesting operations with said harvesting attachment mounted on said front section of the machine.

2. The machine according to claim 1, wherein the receiving assembly is mounted on said rear section of the machine.

3. The machine according to claim 1, wherein the machine is a self-propelled harvester.

4. The machine according to claim 1, wherein the receiving assembly pivotally receives the transport device.

5. The machine according to claim 1, wherein the receiving assembly includes an arm arrangement mounted for pivoting vertically between a lowered position and a raised storage position; and said transport device being coupled to said arm arrangement such that said arm arrangement pivotally moves the transport device in a generally vertical direction when said arm arrangement moves between said lowered position and said raised storage position.

6. The machine according to claim 1, wherein said arm arrangement of the receiving assembly includes at least one pivotable supporting arm.

7. The machine according to claim 6, wherein the at least one supporting arm includes said at least one a receiving device.

8. The machine according to claim 7, wherein said at least one receiving device is one of a U-shaped portion, a claw, and a hook.

9. The machine according to claim 1, wherein said receiving assembly includes a portion to which said transport device is coupled, with said portion being mounted for pivoting between a lowered position and raised storage position; and
   further including an actuating device coupled so as to pivot at least said portion of the receiving assembly between said lowered position and raised storage position.

10. The machine according to claim 9 wherein the actuating device contains at least one manually-actuatable crank device.

11. The machine according to claim 5 and, further including at least one securing device, the securing device securing one of the receiving assembly and the transport device in said raised storage position for transport of the machine.

12. The machine according to claim 1, wherein said wheel arrangement of the transport device includes a frame having at least one wheel and at least one receiving means, the receiving means being engageable by said receiving device of the receiving assembly to allow the transport device to be coupled to the receiving assembly.

\* \* \* \* \*